United States Patent [19]
Naddell et al.

[11] Patent Number: 5,450,618
[45] Date of Patent: Sep. 12, 1995

[54] FULL DUPLEX AND HALF DUPLEX COMMUNICATION UNIT WITH VOLUME SETTING

[75] Inventors: Marc C. Naddell, Chicago; Gary W. Grube, Palatine, both of Ill.

[73] Assignee: Motorola, Inc., Schaumburg, Ill.

[21] Appl. No.: 876,545

[22] Filed: Apr. 30, 1992

[51] Int. Cl.$^6$ .................. H04B 1/52; H04B 1/16; H04M 9/08
[52] U.S. Cl. .................. 455/89; 455/200.1; 370/31; 379/420
[58] Field of Search .................. 379/420–422, 379/432, 406, 388–391, 411, 63; 455/89, 90, 200.1, 74, 116; 370/24, 31

[56] References Cited
U.S. PATENT DOCUMENTS

| | | | |
|---|---|---|---|
| 4,400,581 | 8/1983 | Jacobson | 379/420 |
| 4,495,652 | 1/1985 | Leslie | 455/200.1 |
| 4,720,856 | 1/1988 | Pace et al. | 379/420 |
| 4,912,758 | 3/1990 | Arbel | 379/411 |

FOREIGN PATENT DOCUMENTS

| | | | |
|---|---|---|---|
| 3-297232A | 12/1991 | Japan | 379/63 |
| 2174578 | 11/1986 | United Kingdom | 379/420 |

OTHER PUBLICATIONS
Systems Saber, by Motorola, 1990.

*Primary Examiner*—Reinhard J. Eisenzopf
*Assistant Examiner*—Lisa Charouel
*Attorney, Agent, or Firm*—Timothy W. Markison

[57] ABSTRACT

A communication unit is improved to comprise a volume/mode selection switch, mode detector, volume level setting detector, and a processor. The mode detector and the volume level setting detector monitor the volume/mode selection switch to determine, respectively, the selected mode of operation and the volume level setting. The processor, which is operably coupled to the mode detector and the volume level setting detector, processes the mode of operation and the volume level setting based on the mode of operation selected.

2 Claims, 2 Drawing Sheets

FULL DUPLEX AND HALF DUPLEX COMMUNICATION UNIT WITH VOLUME SETTING

FIELD OF THE INVENTION

This invention relates generally to communication units that operate in a communication system and in particular to a communication unit that is improved to include means for automatically adjusting volume settings when the unit is switched between full duplex and half duplex modes of operation.

BACKGROUND OF THE INVENTION

Communication systems are known to comprise a plurality of communication units, a limited number of communication resources that are transceived via repeaters or base stations, and a communication resource allocator that allocates the limited number of communication resources among the communication resources. The communication units are typically arranged into communication groups such that when a communication unit is allocated a communication resource, that resource is allocated to the communication group of that particular communication unit. In some circumstances, the communication unit may be requesting communication resource for a private call, i.e, a one to one or telephone call where only the requesting communication unit and the target communication unit have access to the allocated communication resource. Note that a communication resource may be a time division multiplex (TDM) slot(s), a carrier frequency, a pair of carrier frequencies, or any other RF transmission means.

When the communication unit is involved in a communication with its communication group, the communication is typically carded out in half duplex fashion, i.e. the communication unit cannot simultaneously transmit and receive voice dam. While the communication unit is operating in a half duplex mode, its operator typically has the communication unit mounted in a vehicle, or on his or her person. Whether the communication unit is mounted in a vehicle or on the operator's person, it is a substantial distance from the operator's ear such that the volume levels need to be set at reasonably high levels for the operator to adequately hear received audio signals.

When the communication unit is involved in a one to one communication, the communication unit is operating in a full duplex manner, i.e. the communication unit can simultaneously receive and transmit audio data. Typically, when an operator is using his or her communication unit is this fashion, the communication unit is relatively close to the operator's ear such that the volume levels need to be at a relatively low level in comparison to volume levels when the unit is operating is a half duplex mode.

As is known, recent advancements in technology have combined full duplex and half duplex operations in to one communication unit. When the operator switches from full duplex mode, i.e. a one to one telephone call, to a half duplex mode, i.e. a group dispatch call, or vis versa, the operator must adjust the volume level. In one instance, the operator may not hear the communication and in the other, the operator may have his or her ear drum damaged. Neither case is advantageous for an operator. Therefore, a need exists for a method and means that provides automatic switching of audio levels when a communication unit is switched from full duplex operation to half duplex operation.

SUMMARY OF THE INVENTION

These needs and others are substantially met by the improved communication unit disclosed herein. In an improved communication unit that operates in at least one communication system, wherein the communication unit includes a transceiver and controlled audible device that is operably coupled to the transceiver, the communication unit is improved to comprise a volume/mode selection switch, mode detection device, volume level setting detection device, and processor. The volume/mode selection switch sets the controlled volume level and also selects the mode of operation. The mode detection means, which is operably coupled to the volume/mode selection switch, detects the mode of operation. The volume level setting detection device, which is operably coupled to the volume/mode selection means, detects the controlled volume level settings. The processor, which is operably coupled to the mode detection device, the volume level detection device, and the controlled audible device, processes the mode of operation and the controlled volume level setting.

DESCRIPTION OF A PREFERRED EMBODIMENT

Generally, a communications unit that incorporates this invention provides a volume/mode selection switch that allows the operator to conveniently select between full and half duplex modes of operation, as well as the ability to set the controlled volume level with one mechanical switch. When in full duplex mode, such as when making a telephone call, the volume level is automatically set at a predetermined level regardless of the volume level setting to provide telephone style calling convenience. When operating in a half duplex mode, such as during a dispatch trunked radio talkgroup call, the volume level setting is adjustable to allow for ambient noise conditions and personal preferences of the operator.

Figure 1:
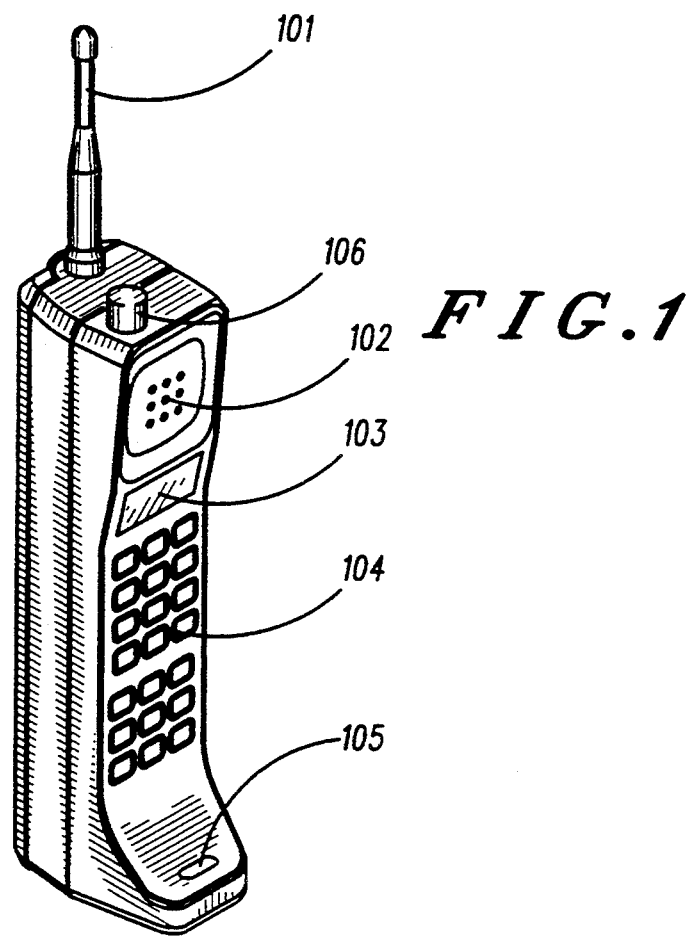
FIG. 1 illustrates a communication unit that may incorporate the present invention.

The present invention can be more fully described with reference to FIGS. 1-4. FIG. 1 illustrates a communications unit, such as Motorola's STX trunked portable, comprising of an antenna 101, a speaker microphone 102, a display 103, a keypad 104, a volume/mode button 106, and a microphone 105. As is known, the communication unit can operate in a half duplex mode or full duplex mode. The circuitry needed to function in either mode is known, thus no further discussion will be presented except as needed to support the present invention.

Figure 2:
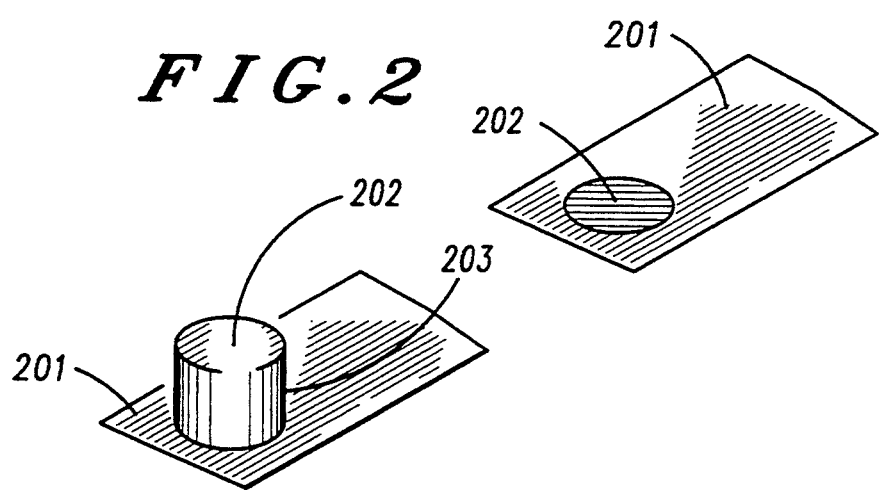
FIG. 2 illustrates a multi function selection device that may be used to implement the present invention.

FIG. 2 illustrates a detailed illustration of the volume/mode button 106, which comprises the radio top escutcheon 201, the top of the volume/mode button 202, and the volume/mode button staff 203. When the volume/mode button 106 is in the extended position (the staff is exposed), a half duplex mode of operation is selected. With the staff exposed, the button 106 can be rotated to adjust the volume level of received audio signals and, in a full rotation position, can be used to turn the communication unit on/off. When the button 106 is depressed (the staff is not exposed), a full duplex mode of operation is selected and the volume level is set at a predetermined level regardless of the rotation position of the button.

Figure 3:
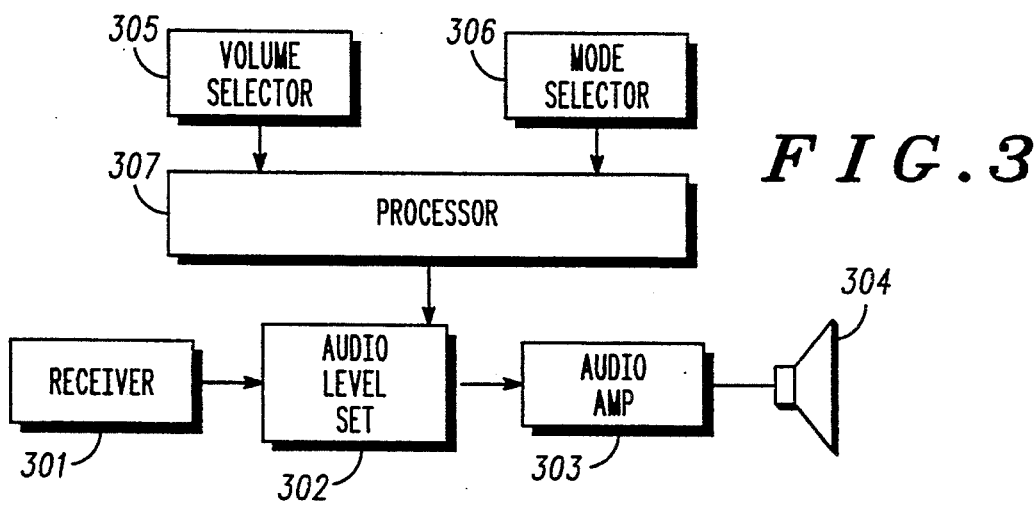
FIG. 3 illustrates a schematic diagram that may be used to implement the present invention.

FIG. 3 illustrates a circuit implementation of the present invention that comprises a receiver, or transceiver, 301, a controlled audible level device 302, an audio amplifier 303, a speaker 304, a volume level selection device 305, a mode detection device 306, and a processor 307, such as a Motorola 68HC11. The receiver 301, the controlled audible level device 302, the audio amplifier 303, and the speaker 304 are of known construction, thus no further discussion or description of these elements will be provided except to illustrate the present invention.

The volume level selection device 305 and the mode detection device 306 comprise the volume/mode button 202 FIG. 2. The button could be an on/off volume rotary switch as is found on the Motorola STX trunked portable radio, which has a mechanical stop, and also adjusts the volume when not set in the extreme counter-clockwise, or off, position. The processor 307 is used to measure whether or not the radio is off, the mode of operation, and the volume level setting when half duplex operation is selected. When the processor 307 has collected and analyzed the inputs from the volume level selection device 305 and the mode detection device 306, the processor adjusts the controlled audible device 302 to provide the correct output to the audio amplifier 303.

Figure 4:
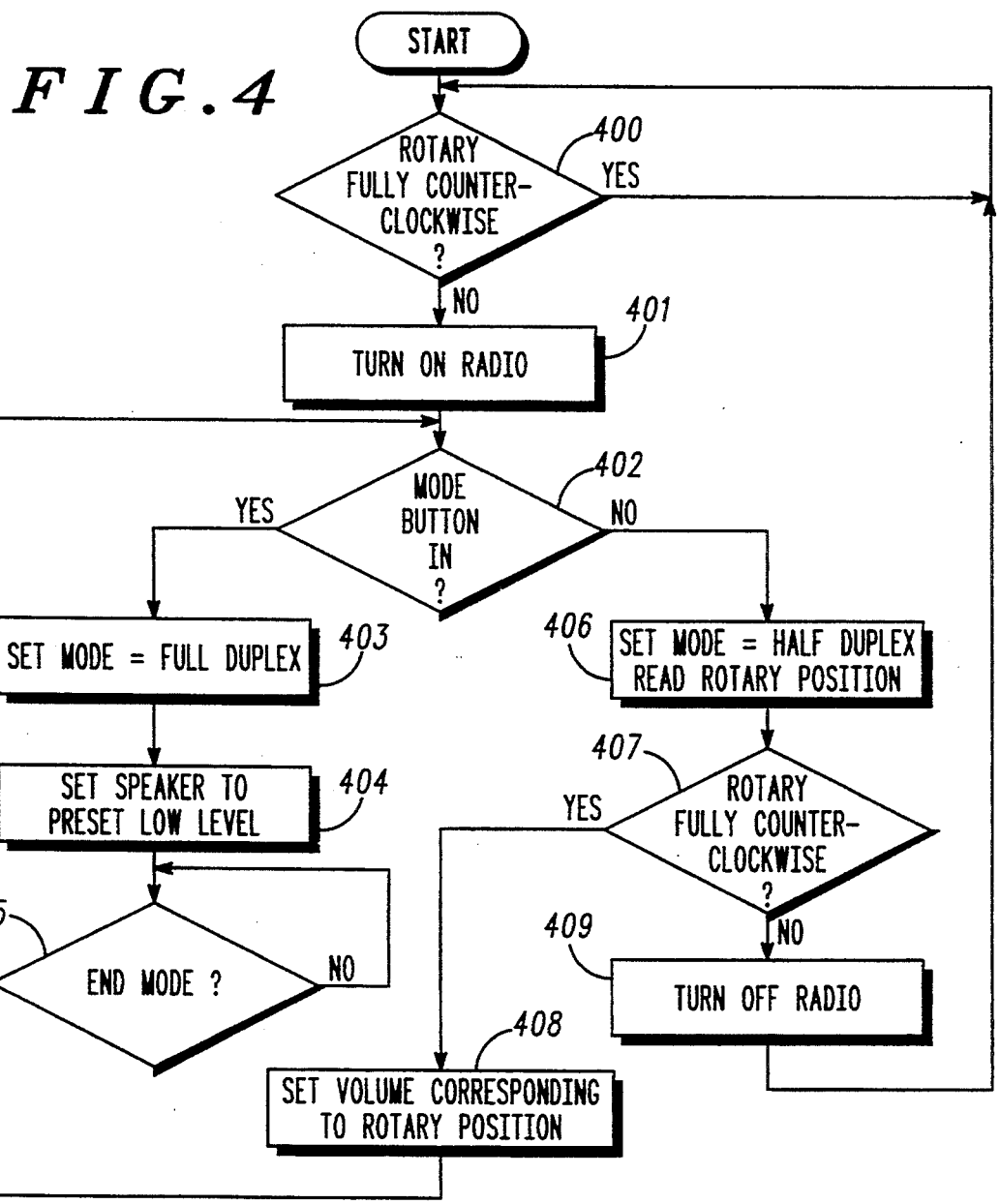
FIG. 4 illustrates a logic diagram that may be used to implement the present invention.

FIG. 4 illustrates a flow diagram that a communication unit may utilize to implement the present invention. In most communication units, the present algorithm may be stored and executed by existing memory and processors, however, in other communication units, additional memory and processors may need to be added. At step 400, the communication unit determines whether the volume select rotary switch is fully counterclockwise. If so, the communication unit remains off, and will continue to monitor the switch for a change. When the switch is not fully counterclockwise, the communication unit is turned on 401.

When the switch is in the "on" position, the communication unit determines whether the switch is set for full duplex operation (staff concealed) or whether the switch is set for half duplex operation (staff exposed) 402. When the switch staff is concealed (switch pushed in), the communication unit is set to the full-duplex mode of operation 403. In the full duplex mode, the audio level is set to a predetermined low level regardless of the volume setting on the switch 404. This allows the communication unit to be used in a telephone style calling manner. While in this mode of operation, the communication unit continues to monitor the switch for a change in the mode of operation 405. When the mode of operation changes, the full duplex mode ends and the process repeats at step 402.

When the switch staff is exposed, the communication unit is set to the half-duplex mode of operation 406. After enabling the half duplex mode, the communication unit monitors the volume on/off control rotary switch to determine the volume setting or whether the communication unit is off 407. If the switch indicates that the communication unit is off, the communication unit is turned off and the process repeats at step 400. If the communication unit is on, it determines the volume level setting based on the position of the switch 408.

Setting the volume level based on the position of a rotary switch is well known, thus no further discussion will be presented. Having set the volume level, the process repeats at step 402. An alternative to repeating the process at step 402 would be to have the communication unit monitor for a change in either the volume level setting or the mode selection and, when one of these conditions occur, proceed to the appropriate step in the process (i.e. 408 for a volume change, 402 for a mode selection change).

Accordingly, a communication unit which employs the present invention is able to easily switch between a half-duplex mode of operation and a full-duplex mode of operation where the audio level presented to the speaker is automatically adjusted between a preset low level for full-duplex and a user selectable level for half-duplex. The mechanical arrangement of the mode/volume selector switch has at least three predetermined positions: one to turn the radio on and off; a second to select a full duplex mode of operation; and a third to select a half duplex mode of operation. In addition, the multiposition switch provides the user a mechanical indication that the volume level is not user selectable in the full-duplex mode (e.g. the rotary button is fully depressed).

We claim:

1. An improved communication unit that operates in at least one communication system, wherein the communication unit includes a receiver, a controlled audible level device, an audio amplifier, and a speaker, the communication unit is improved to comprise:

a volume/mode selection switch, wherein the volume/mode selection switch, when in a first predetermined position, selects an on/off mode of operation, and, when in a second predetermined position, selects a full duplex mode of operation, and, when in a third predetermined position, selects a half duplex mode of operation and a controlled volume level; and a processor that is operably coupled to the volume/mode selection switch, wherein the processor detects the mode of operation and when the half duplex mode of operation is selected, the processor provides the controlled volume level to the controlled audible level device, and when the full duplex mode of operation is selected, the processor provides a predetermined volume level setting to the controlled audible level device.

2. In a communication unit that operates in at least one communication system, wherein the communication unit includes a receiver, a processor, a controlled audible level device, an audio amplifier, a speaker and a volume/mode selection switch, a method for the communication unit to process full duplex and half duplex communications at controlled volume level settings, the method comprises the steps of:

a) determining, by the processor, the mode of operation selected on the volume/mode selection switch;

b) when the volume/mode selection switch is set for full duplex communication, processing, by the processor, full duplex operation and setting the controlled audible level device to a predetermined volume level independent of a volume setting on the volume/mode selection switch;

c) when the volume/mode selection switch is set for half duplex communication, processing, by the processor, half duplex operation and setting the controlled audible level device to a volume level as set on the volume/mode selection switch.

* * * * *